(12) United States Patent
Hutter et al.

(10) Patent No.: US 11,727,277 B2
(45) Date of Patent: Aug. 15, 2023

(54) METHOD AND APPARATUS FOR AUTOMATICALLY PRODUCING AN ARTIFICIAL NEURAL NETWORK

(71) Applicant: Robert Bosch GmbH, Stuttgart (DE)

(72) Inventors: Frank Hutter, Freiburg (DE); Jan Hendrik Metzen, Boeblingen (DE); Thomas Elsken, Sindelfingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 429 days.

(21) Appl. No.: 16/756,983

(22) PCT Filed: Oct. 24, 2018

(86) PCT No.: PCT/EP2018/079088
§ 371 (c)(1),
(2) Date: Apr. 17, 2020

(87) PCT Pub. No.: WO2019/081545
PCT Pub. Date: May 2, 2019

(65) Prior Publication Data
US 2021/0133576 A1 May 6, 2021

(30) Foreign Application Priority Data
Oct. 26, 2017 (DE) ............ 10 2017 219 282.8

(51) Int. Cl.
*G06N 3/08* (2023.01)
*G06N 3/082* (2023.01)
(Continued)

(52) U.S. Cl.
CPC .......... *G06N 3/082* (2013.01); *G06F 18/211* (2023.01); *G06N 3/086* (2013.01)

(58) Field of Classification Search
CPC ....... G06N 3/082; G06N 3/086; G06K 9/6228
(Continued)

(56) References Cited

U.S. PATENT DOCUMENTS

| 2009/0248599 A1* | 10/2009 | Hueter | G06Q 30/0631 706/15 |
| 2018/0060724 A1* | 3/2018 | Wang | G06N 3/082 |
| 2018/0144242 A1* | 5/2018 | Simard | G06N 3/084 |

FOREIGN PATENT DOCUMENTS

| DE | 202017102238 U1 | 5/2017 |
| KR | 101774844 B1 | 9/2017 |

OTHER PUBLICATIONS

Magoulas, et al., "Improving the Convergence of the Backpropagation Algorithm Using Learning Rate Adaptation Methods", Neural Computation 11, 1769-1796 (1999) (Year: 1999).*
(Continued)

*Primary Examiner* — Tsu-Chang Lee
(74) *Attorney, Agent, or Firm* — Norton Rose Fulbright US LLP; Gerard Messina

(57) ABSTRACT

A method for automatically generating an artificial neural network that encompasses modules and connections that link those modules, successive modules and/or connections being added to a current starting network. Modules and/or connections that are to be added are selected randomly from a predefinable plurality of possible modules and connections that can be added. A plurality of possible refinements of the current starting network respectively are generated by adding to the starting network modules and/or connections that are to be added. One of the refinements from the plurality of possible refinements is then selected in order to serve as a current starting network in a subsequent execution of the method.

13 Claims, 3 Drawing Sheets

(51) Int. Cl.
*G06N 3/086* (2023.01)
*G06F 18/211* (2023.01)

(58) Field of Classification Search
USPC .......................................................... 706/15
See application file for complete search history.

(56) References Cited

OTHER PUBLICATIONS

International Search Report for PCT/EP2018/079088, dated Jan. 30, 2019.
Risto Miikkulainen et al., "Evolving Deep Neural Networks" arxiv.org, Cornell University Library, 201 Olin Library Cornell University Ithaca, NY 14853, 2017, pp. 1-8. XP080753649.
Ilya Loshchilov et al., "SGDR: Stochastic Gradient Descent With Warm Restarts", arxiv.org, 2017, pp. 1-16. https://arxiv.org/abs/1608.03983 XP055544449.
Han Cai et al., "Reinforcement Learning for Architecture Search By Network Transformation", Arxiv Preprint Arxiv:1707.04873V1, 2017, pp. 1-8.

* cited by examiner

METHOD AND APPARATUS FOR AUTOMATICALLY PRODUCING AN ARTIFICIAL NEURAL NETWORK

FIELD

The present invention relates to a method for automatically generating an artificial neural network, a computer program that encompasses instructions that are configured to carry out the method when it is executed on a computer, a machine-readable memory medium on which the computer program is stored, and a system, in particular encompassing one or several computers, which is configured to carry out the method.

BACKGROUND INFORMATION

A method for automatically generating an architecture of an artificial neural network by reinforcement learning is described in Han Cai, Tianyao Chen, Weinan Zhang, Yong Yu, Jun Wang, "Reinforcement Learning for Architecture Search by Network Transformation," arXiv preprint arXiv: 1707.04873v1, 2017, the network being made deeper or wider while maintaining its functionality.

SUMMARY

An example method in accordance with the present invention may make possible very efficient automatic construction of a high-performance enlarged artificial neural network.

Advantageous refinements are the present invention are described herein.

In a first aspect, the present invention proves an example method for automatically generating an artificial neural network that encompasses modules and connections that link those modules; successive modules and/or connections being added to a current starting network; modules and/or connections that are to be added being selected randomly from a predefinable plurality of possible modules and connections that can be added; and a plurality of possible refinements of the current starting network respectively being generated by adding to the starting network modules and/or connections that are to be added (i.e., each of the refinements is respectively made up of the current starting network and the added modules and/or connections); and one of the refinements from the plurality of possible refinements then being selected in order to serve as a current starting network in a subsequent execution of the method.

"Modules" are units of the neural network which, as a function of an (if applicable, vectorial) input variable, ascertains an (if applicable, vectorial) output variable. A module can be, for example, a layer of the artificial neural network, or artificial neurons.

In other words, "successive" means that the method encompasses a plurality of passes, in each pass possible refinements being generated proceeding from the current starting network, and a (preferably best) refinement then being selected therefrom in order to serve in the next pass as a current starting network.

In other words, a plurality of possible refinements are repeatedly created, and from them only one (preferably one best) refinement is selected which then in turn serves as a basis for further refinements. The artificial neural network can thereby be enlarged step by step. It has been recognized that a "greedy" procedure of this kind, surprisingly, results quickly in a very high-performance neural network and does not, for example, lead to inhibiting secondary minimums.

In a refinement of the present invention, provision can be made that upon addition of the respective modules and/or connections, predefinable parameters that characterize the respective modules and/or connections that are to be added are selected in such a way that the starting network to which the modules and/or connections respectively to be added are added supplies, for each possible input variable, output variables unmodified respectively before and after addition of the respective modules and/or connections that are to be added.

In other words, the corresponding parameters of the modules and/or connections that are to be added are selected in such a way that the starting network, and the network expanded by addition of the modules and/or connections that are to be added, are functionally equivalent. The possible refinements thereby become very much more quickly trainable, which speeds up the method.

Alternatively or in addition, in accordance with the present invention, provision can be made that that current starting network which serves as a starting point for a first-time addition of modules and/or connections is trained with an initial training data set prior to the first-time addition of modules and/or connections. This results in a further acceleration of the example method.

Alternatively or additionally, in accordance with the present invention, provision can be made that the possible refinements of the current starting network are respectively trained with a training data set before one of the refinements from the plurality of possible refinements is then selected in order to serve as a current starting network in the next execution of the method.

The selection of the one refinement from the plurality of possible refinements can be accomplished depending on a variable that characterizes a respective capability of each one of the plurality of possible refinements. This variable can preferably be selected depending on output variables of the respective one refinement of the plurality of refinements.

In a refinement of this aspect of the present invention, provision can be made that the refinements of the starting network are respectively trained using a gradient descent method, a parameter that characterizes a learning rate of the gradient descent method being selected to decrease with an increasing number of training epochs carried out.

In other words, the variable characterizing the learning rate is selected in such a way that it decreases with an increasing learning duration. This has the advantage that the gradient descent method converges particularly quickly. This is because it has been recognized that fluctuations in an estimated gradient can thereby be particularly reliably counteracted.

The decreasing profile of the parameter that characterizes the learning rate is characterized by way of a trigonometric function.

This is a particularly simple way to characterize a decreasing learning rate that has a preferred smooth profile. For example, the variable $$\propto \left(1 + \cos\left(\frac{t}{T}\pi\right)\right)$$

characterizing the learning rate can be selected, where t designates a training time (measured, for example, in training epochs), and T designates a predefinable total time.

In a further aspect of the present invention, provision can be made in accordance with an example embodiment, that the predefinable plurality of possible modules and/or connections encompasses a normalization module and/or a skip connection and/or a module that contains a nonlinear function; the nonlinear function being idempotent for at least one value of a parameter characterizing its behavior. Thanks to this condition of the nonlinear function, the characterizing parameter can be selected in such a way that the nonlinear function does not modify the starting variable if the idempotent function is already present in the starting network directly before or after the nonlinear function.

The normalization module can be, for example, a layer normalization or a batch normalization. It has been recognized that these modules can be efficiently initialized, and acceptance thereof into the predefinable plurality of possible modules makes it possible to efficiently generate capable artificial neural networks.

In accordance with the present invention, provision can be made in particular that the predefinable plurality of possible modules and/or connections contains the normalization module and the skip connection and the module containing the nonlinear module, and a module containing a nonlinear function, and a module that propagates an existing linear layer by adding units or channels, and contains a module that propagates a linear layer by duplicating that linear layer.

It has been found that artificial neural networks can be generated particularly efficiently using this predefinable plurality of possible modules and/or connections.

In further aspects, the present invention provides a computer program that is configured to execute the method according to the present invention. In other words, the computer program encompasses instructions that cause a computer to perform the method according to the present invention when it executes the computer program.

In other further aspects, the present invention provides a machine-readable memory medium on which that computer program is stored, and to a computer that is configured to execute the method.

Embodiments of the present invention are explained in further detail below with reference to the figures.

DETAILED DESCRIPTION OF EXAMPLE EMBODIMENTS

Figure 1:
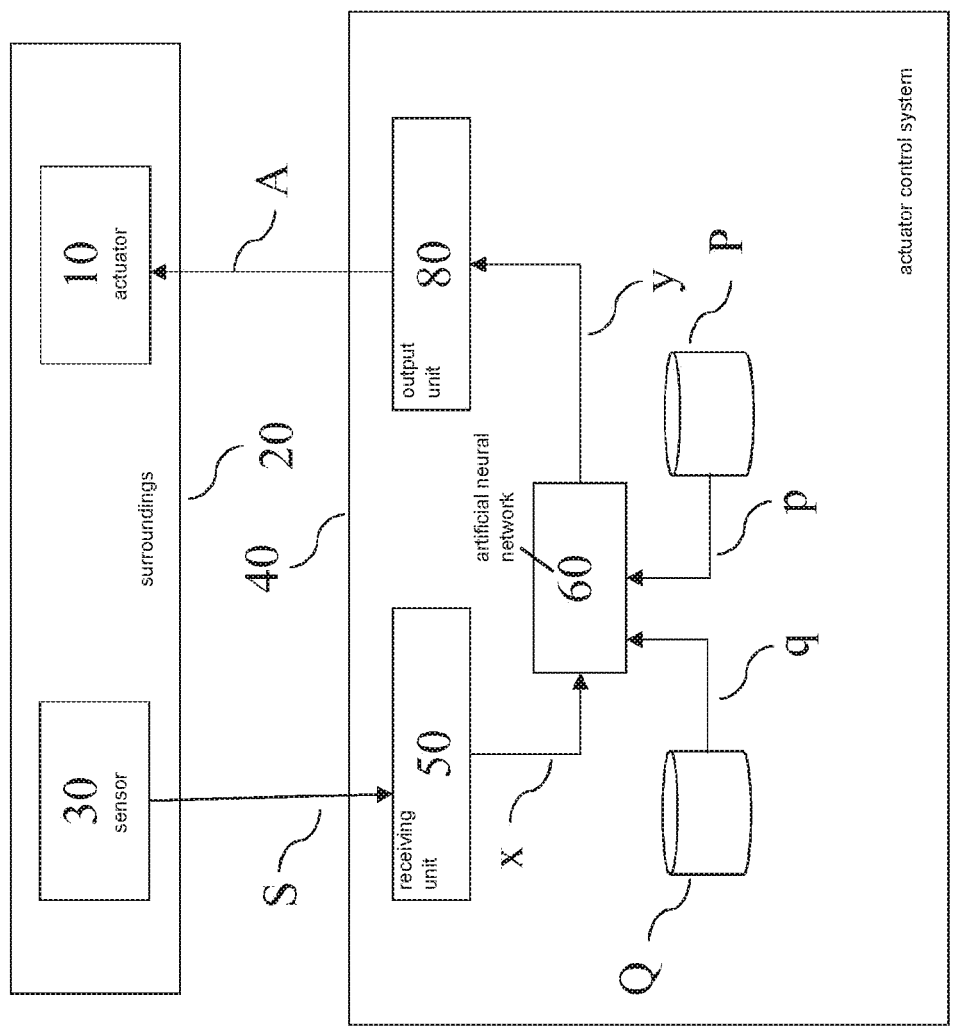
FIG. 1 schematically depicts a possible utilization of an artificial neural network generated according to the present invention.

FIG. 1 shows, by way of example, an actuator 10 in its surroundings 20 in interaction with an actuator control system 40. Actuator 10 and surroundings 20 are also collectively referred to hereinafter as an "actuator system." A state of the actuator system is detected with a sensor 30 that can also be embodied by a plurality of sensors. An output signal S of sensor 30 is conveyed to actuator control system 40. Actuator control system 40 ascertains therefrom a control application signal A that actuator 10 receives.

Actuator 10 can be, for example, a (semi-)autonomous robot, for example a (semi-)autonomous motor vehicle. Sensor 30 can be, for example, one or several video sensors and/or one or several radar sensors and/or one or several ultrasonic sensors and/or one or several position sensors (for example GPS). Alternatively or additionally, sensor 30 can also encompass an information system that ascertains information regarding a state of the actuator system, for example a weather information system that ascertains a current or future state of the weather in surroundings 20.

In another exemplifying embodiment, actuator 10 can be a manufacturing robot, and sensor 30 can then, for example, be an optical sensor that detects properties of products manufactured by the manufacturing robot.

In a further exemplifying embodiment, actuator 10 can be an enabling system that is configured to enable, or not, the activity of a device. Sensor 30 can be, for example, an optical sensor (for example, for detecting image data or video data) that is configured to detect a face. Actuator 10 ascertains, depending on control application signal A, an enabling signal that is used in order to enable the device depending on the value of the enabling signal. The device can be, for example, a physical or logical access control system. Depending on the value of control application signal A, the access control system can then stipulate whether or not access is granted.

It is also possible for control to be applied, instead of to actuator 10, for example to a medical diagnosis system that outputs a medical diagnosis depending on control application signal A. If sensor 30 is an optical sensor that detects medical images, control application signal A can be, for example, a semantic segmentation (optionally equipped with comments) of the images, in which regions that appear to be particularly relevant for a medical diagnosis are highlighted. In this case, reference character 40 designates an agent control system.

Actuator control system 40 receives output signal S of the sensor in an optional receiving unit 50 that converts output signal S into a data signal x (alternatively, output signal S can also be accepted directly as data signal x). Data signal x can be, for example, a portion or a reworking of output signal S. Data signal x is delivered as an input signal to an artificial neural network 60. The structure of the artificial neural network is characterized by structural parameters q that are stored in a structural parameter memory Q. Artificial neural network 60 is parameterized by predefinable parameters p that are stored in a parameter memory P.

In a preferred exemplifying embodiment that is described below, data signal x is a two-dimensional image signal whose pixels are characterized, for example, by one numerical value (brightness coding) or by three numerical values (RGB coding). Data signal x can also, however, be a different one- or multi-dimensional data signal.

Artificial neural network 60 ascertains from input signal x (here, from image signal x) an associated output signal y, for example a pixel-wise semantic segmentation. A semantic value is associated with each region of image signal x.

Output signal y (here, semantic segmentation y) is conveyed to an output unit 80 that ascertains control application signal A therefrom. In other words, control application signal A is ascertained depending on semantic segmentation y. In other embodiments it is also possible for output unit 80 to accept output signal y directly as control application signal A.

In an embodiment, actuator control system 40 encompasses a computer and a machine-readable storage medium (not depicted) on which is stored a computer program that, when it is executed by the computer, causes the latter to perform the above-described functionalities of actuator control system 40.

Figure 2:
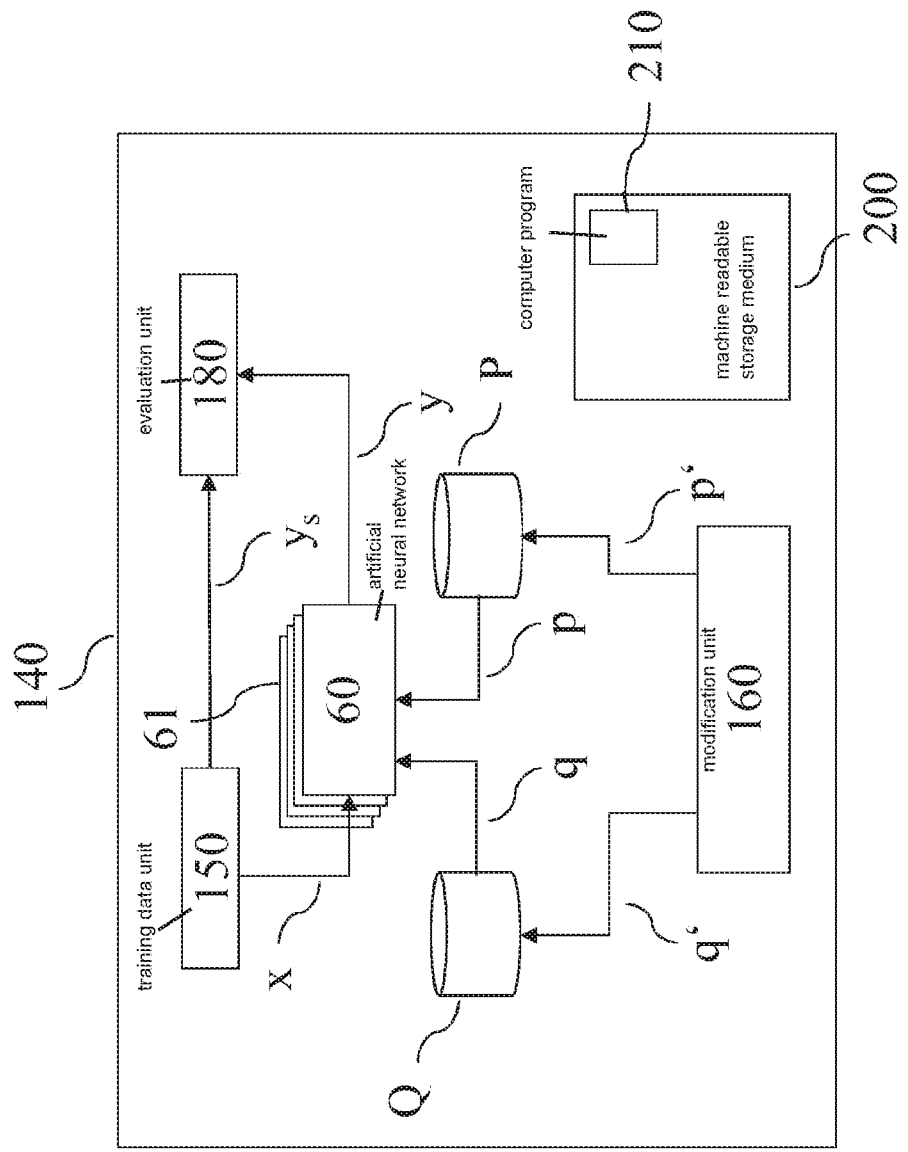
FIG. 2 schematically shows an exemplifying learning system for generating an artificial neural network.

FIG. 2 schematically shows an exemplifying embodiment of a system 140 for generating artificial neural network 60.

A training data unit 150 ascertains suitable input variables x that are delivered to the artificial neural network. For example, training data unit 150 accesses a computer-implemented database in which a set of training data is stored, and (for example, randomly) selects input variables x from the set of training data. Optionally, training data unit 150 also ascertains desired output variables y, associated with input variables x, which are delivered to an evaluation unit 180.

Artificial neural network 60 is configured to ascertain, from input variables x delivered to it, associated output variables y. These output variables y are delivered to evaluation unit 180.

Figure 3:
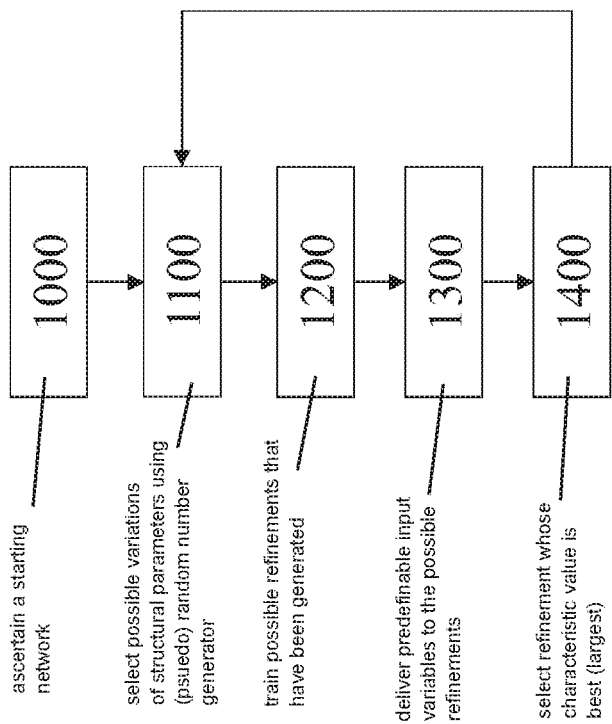
FIG. 3 shows, in a flow chart, a possible sequence of an example method for generating an artificial neural network.

A modification unit 160 ascertains new structural parameters q' and new parameters p', for example using the method illustrated in FIG. 3, and delivers them to structural parameter memory Q and to parameter memory P, where they replace structural parameters q and parameters p. Possible variations of structural parameters q are stored in modification unit 160. One such possible variation of structural parameters q corresponds respectively to a possible combination of modules and connections that can be added to artificial neural network 60.

According to an aspect of the present invention, proceeding from a starting version of artificial neural network 60 (the starting network), a respective possible refinement 61 of artificial neural network 60 is therefore created by delivering structural parameters q and parameters p to artificial neural network 60. Input variables x can be delivered correspondingly to each of these refinements 61 as they are to artificial neural network 60, so that it then ascertains corresponding output variables y.

Evaluation unit 180 can ascertain, for example by way of a loss function dependent on output variables y and on the desired output variables $y_s$, a characteristic value $\mathcal{L}$ that characterizes a capability of artificial neural network 60 or of refinements 61.

In a context of fixed structural parameters q, artificial neural network 60 or refinements 61 can be optimized by varying parameters p. By way of the capability-characterizing characteristic parameters $\mathcal{L}$ that then result, it is possible to select that refinement 61 which is most capable.

System 140 can encompass, for example, a computer or a plurality of computers, and in the exemplifying embodiment it encompasses a machine-readable storage medium 200 on which computer program 210, which is configured to execute the method according to the present invention, is stored.

FIG. 3 is a flow chart of a possible sequence of an example method for generating an artificial neural network 60.

Firstly (1000) a starting network 60 is ascertained, for example by reading the characterizing structural parameter q out of a memory region. Optionally, parameters p associated therewith are trained.

Then (1100), by way of a (pseudo)random number generator, possible variations of structural parameters q are selected, for example eight or 16 different ones; this number is of course freely selectable, but it has been found that a number in the range from eight to 16 yields particularly good results. In other words, a plurality of, for example eight to 16, possible refinements 61 are generated in parallel, each being produced from starting network 60 by the addition of a combination of modules and/or connections which encompass one or several of the following combinations:

A first possible combination is the addition of a linear layer before a predefinable (and preferably randomly selected) reference layer of starting network 60. The predefinable reference layer can also be the output of starting network 60. In other words, input variables $z_e$ are delivered to the reference layer which generates output variables therefrom, so that before that layer a linear layer is inserted which receives the input variables $z_e$, ascertains therefrom transformed input variables $z_e' = a*z_e + b$ (with freely selectable parameters a, b), and delivers those transformed input variables $z'_e$ to the reference layer in place of the input variables $z_e$. It is preferable to select b=0 and a=1.

A second possible combination is the addition of a nonlinear layer before the predefinable reference layer. Here an idempotent function h of the reference layer is identified (it can be identified, for example, by delivering input variable $z_e$ to the function relu(x)=max(0,x)). Parameters that characterize the idempotent function h that is to be added are preferably selected to be equal to the corresponding parameters of the idempotent functions, present in the reference layer, to which the output variable of the idempotent function h that is to be added is delivered. Alternatively, a nonlinear function can also be inserted even if an idempotent function has not necessarily been identified in the reference layer. The nonlinear function that is to be added can then be selected (e.g. as a convex linear combination) in such a way that it produces identity for a specific parameter. In other words, instead of input variables $z_e$, transformed input variables $z_e' = a*h(z_e) + (1-a)*z_e$ are delivered to the reference layer. Preferably, a=0 is selected initially.

A third possible combination is the addition of individual neurons to the predefinable reference layer. Here the parameters that characterize the functional correlation of the input of the input variables into an output variable of the reference layer are preferably selected so that the functional dependence of the output variable of the reference layer on the input variable remains unchanged.

A fourth possible combination is the addition of individual connections to the predefinable reference layer. For example, a connection parallel to an already-existing connection can be added. Here the parameters that characterize the functional correlation of the input of the input variables into an output variable of the reference layer are preferably selected so that the functional dependence of the output variable of the reference layer on the input variable remains unchanged.

A fifth possible combination is the addition of a skip connection between two (preferably randomly selected) predefinable reference layers, i.e. from a predefinable starting layer into a predefinable destination layer. A skip connection of this kind can be selected in such a way that its output variable in the destination layer is added to another output variable (in this case the parameters of the skip connection are preferably selected in such a way that the weight of the skip connection is selected to be equal to 0 and the weight of the added output variable to be equal to 1).

A sixth possibility is analogous to the fifth possibility, with the difference that the skip connection is selected in such a way that its output variable in the destination layer is concatenated with another output variable (in this case, weights that weight the concatenated components are preferably selected to be equal to 0).

A seventh possibility is adding a normalization module behind a predefinable (and preferably randomly selected) reference layer of starting network 60. Depending on a statistical distribution of output variables $z_r$ of the reference layer, statistical parameters $\mu, \sigma$ are ascertained which, for example, can correspond to an average or to an estimated standard distribution of the selected parameters. These parameters can be ascertained in a manner that is averaged, for example, over rows and/or columns of a layer, or also over the output variables of the reference layer over a batch of input variables x of refinement 61. An output variable $y_r$ of the normalization module can be selected as $$y_r = \gamma \cdot \frac{z_r - \mu}{\sqrt{\sigma^2 + \epsilon}} + \beta$$

In the interest of numerical stability, the parameter $\epsilon$ can be set to a fixedly selected small value, e.g. $\epsilon = 10^{-10}$. The parameters $\gamma, \beta$ are preferably selected as $$\gamma = \sqrt{\sigma^2 + \epsilon}$$

$$\beta = \mu$$

Then (1200) the possible refinements 61 that have been generated are trained. For this, each of the generated possible refinements 61 is delivered, in training epochs, to input variables x, and depending on output variables y ascertained from input variables x, the capability-characterizing characteristic value $\mathcal{L}$ is ascertained. The parameters p are then successively iteratively varied, where $p_0 = p$, $p_{t+1} = p_t - \eta_t \nabla_p \mathcal{L}$, where $\eta_t$ is the parameter that characterizes the learning rate. It is preferably selected to decrease with a rising iteration index t, e.g. proportionally to $$\left(1 + \cos\left(\frac{t}{T}\pi\right)\right)$$

with the predefinable total time T. This iteration is carried out until the parameters p have converged for an index $t_c$. The new parameter $p' = p_{t_c}$ is then selected.

Then (1300) predefinable input variables are delivered to the possible refinements 61 that have been generated and trained, and the resulting capability-characterizing characteristic value $\mathcal{L}$ is ascertained for each of the possible refinements 61. It is also possible to use a characteristic value $\mathcal{L}$ ascertained in the course of training in step (1200).

Lastly (1400), depending on the ascertained characteristic values $\mathcal{L}$, that refinement 61 whose characteristic value $\mathcal{L}$ is the best, e.g. the largest, is selected.

A check can now be made as to whether the selected refinement 61 has achieved a sufficiently clearly better characteristic value $\mathcal{L}$ than starting network 60. If that is not the case, the method is terminated and the selected refinement 61 (alternatively, the current starting network 60) yields the generated artificial neural network.

Otherwise the selected refinement 61 now replaces the current starting network 60, i.e. the structural parameters q' associated with the selected refinement 61, and the ascertained parameters p' associated therewith, replace structural parameters q and parameters p. Execution of the method then branches back to step 1100.

Be it noted that along with the generation of artificial neural network 60, a corresponding actuator control system or agent control system 40, in which artificial neural network 60 is utilized, can also be generated. For example, all the other components can be predefined unmodifiably, and only artificial neural network 60 that is contained can be generated.

The method can be implemented as a computer program, i.e., software, or in hardware, or in a mixed form of hardware and software.

What is claimed is:

1. A computer-implemented method for automatically generating an artificial neural network that encompasses modules and connections that link those modules, successive modules and/or connections being added to a current starting network, the method comprising the following steps:
   reading, by a computer processor, parameters representing the current starting network from a computer memory;
   randomly selecting, using a random number generator, modules and/or connections that are to be added from a predefinable plurality of possible modules and connections that can be added;
   respectively generating, by the computer processor, a plurality of possible refinements of a current starting network by adding to existing modules and connections of the current starting network the modules and/or connections that are to be added, wherein upon addition of the respective modules and/or connections that are to be added, predefinable parameters that characterize the respective modules and/or connections that are to be added are selected in such a way that the current starting network to which the modules and/or connections respectively to be added are added supplies, for each possible input variable, output variables unmodified respectively before and after addition of the respective modules and/or connections that are to be added;
   selecting, by the computer processor, one of the refinements from the plurality of possible refinements to serve as a new starting network;
   writing, by the computer processor, parameters representing the new starting network to the computer memory;
   receiving, by an actuator control system including the artificial neural network, a sensor signal from a senor; and
   determining, using the artificial neural network, a control signal for the actuator based on the sensor signal.

2. The computer-implemented method as recited in claim 1, wherein the current starting network which serves as a starting point for a first-time addition of modules and/or connections is trained with an initial training data set prior to the first-time addition of modules and/or connections.

3. The computer-implemented method as recited in claim 1, wherein the possible refinements of the current starting network are respectively trained with a training data set before one of the refinements from the plurality of possible refinements is then selected to serve as the current starting network in a next execution of the method.

4. The computer-implemented method as recited in claim 3, wherein the refinements of the starting network are respectively trained using a gradient descent method, a parameter that characterizes a learning rate of the gradient descent method being selected to decrease with an increasing number of training epochs carried out.

5. The computer-implemented method as recited in claim 4, wherein the decreasing profile of the parameter that characterizes the learning rate being characterized by way of a trigonometric function.

6. The computer-implemented method as recited in claim 1, wherein the predefinable plurality of possible modules and/or connections include a normalization module and/or a skip connection and/or a module that contains a nonlinear function, the nonlinear function being idempotent for at least one value of a parameter characterizing its behavior.

7. The computer-implemented method as recited in claim 6, wherein the predefinable plurality of possible modules and/or connections include the normalization module, and the skip connection, and the module containing the nonlinear module, and a module containing a nonlinear function, and a module that propagates an existing linear layer by adding units or channels, and a module that propagates a linear layer by duplicating that linear layer.

8. A non-transitory machine-readable memory medium on which is stored a computer program for automatically generating an artificial neural network that encompasses modules and connections that link those modules, successive modules and/or connections being added to a current starting network, the computer program, when executed by a computer, causing the computer to perform the following steps:
reading parameters representing the current starting network from a computer memory;
randomly selecting, using a random number generator, modules and/or connections that are to be added from a predefinable plurality of possible modules and connections that can be added;
respectively generating a plurality of possible refinements of a current starting network by adding to existing modules and connections of the current starting network the modules and/or connections that are to be added, wherein upon addition of the respective modules and/or connections that are to be added, predefinable parameters that characterize the respective modules and/or connections that are to be added are selected in such a way that the current starting network to which the modules and/or connections respectively to be added are added supplies, for each possible input variable, output variables unmodified respectively before and after addition of the respective modules and/or connections that are to be added;
selecting one of the refinements from the plurality of possible refinements to serve as the current starting network;
writing parameters representing the new starting network to the computer memory;
receiving, by an actuator control system including the artificial neural network, a sensor signal from a senor; and
determining, using the artificial neural network, a control signal for the actuator based on the sensor signal.

9. A computer system including a non-transitory machine-readable memory medium on which is stored a computer program for automatically generating an artificial neural network that encompasses modules and connections that link those modules, successive modules and/or connections being added to a current starting network, the computer program, when executed by the computer system, causing the computer system to perform the following steps:
reading parameters representing the current starting network from a computer memory;
randomly selecting, using a random number generator, modules and/or connections that are to be added from a predefinable plurality of possible modules and connections that can be added;
respectively generating a plurality of possible refinements of a current starting network by adding to existing modules and connections of the current starting network the modules and/or connections that are to be added, wherein upon addition of the respective modules and/or connections that are to be added, predefinable parameters that characterize the respective modules and/or connections that are to be added are selected in such a way that the current starting network to which the modules and/or connections respectively to be added are added supplies, for each possible input variable, output variables unmodified respectively before and after addition of the respective modules and/or connections that are to be added;
selecting one of the refinements from the plurality of possible refinements to serve as a new starting network;
writing parameters representing the new starting network to the computer memory;
receiving a sensor signal from a senor; and
determining, using the artificial neural network, a control signal for the actuator based on the sensor signal.

10. The computer-implemented method of claim 1, wherein the random number generator is a pseudo random number generator.

11. The computer-implemented method of claim 1, further comprising:
training, by the computer processor, the plurality of possible refinements of the current starting network with a training data set; and
after the training, determining, by the computer processor, a respective capability-characterizing characteristic value for each of the plurality of possible refinements;
wherein the selecting one of the refinements from the plurality of possible refinements to serve as the new starting network is based on the respective capability-characterizing characteristic value for each of the plurality of possible refinements.

12. The non-transitory machine-readable memory medium as recited in claim 8, the steps further including:
training the plurality of possible refinements of the current starting network with a training data set; and
after the training, determining a respective capability-characterizing characteristic value for each of the plurality of possible refinements;
wherein the selecting one of the refinements from the plurality of possible refinements to serve as the new starting network is based on the respective capability-characterizing characteristic value for each of the plurality of possible refinements.

13. The computer system of claim 1, the steps further including:
training the plurality of possible refinements of the current starting network with a training data set; and
after the training, determining a respective capability-characterizing characteristic value for each of the plurality of possible refinements;
wherein the selecting one of the refinements from the plurality of possible refinements to serve as the new starting network is based on the respective capability-characterizing characteristic value for each of the plurality of possible refinements.

* * * * *